(12) United States Patent
Nomura et al.

(10) Patent No.: US 7,657,172 B2
(45) Date of Patent: **\*Feb. 2, 2010**

(54) CONTROLLER, PHOTOGRAPHING EQUIPMENT, CONTROL METHOD OF PHOTOGRAPHING EQUIPMENT, AND CONTROL PROGRAM

(75) Inventors: Kazuo Nomura, Shiojiri (JP); Tatsuya Hosoda, Chino (JP)

(73) Assignee: Seiko Epson Corporation (JP)

( * ) Notice: Subject to any disclaimer, the term of this patent is extended or adjusted under 35 U.S.C. 154(b) by 401 days.

This patent is subject to a terminal disclaimer.

(21) Appl. No.: 11/563,938

(22) Filed: Nov. 28, 2006

(65) Prior Publication Data

US 2007/0122139 A1  May 31, 2007

(30) Foreign Application Priority Data

Nov. 29, 2005  (JP) .............................. 2005-343367

(51) Int. Cl.
*G03B 7/083* (2006.01)

(52) U.S. Cl. ................... 396/246; 348/222.1

(58) Field of Classification Search ................. 396/213, 396/215, 216, 225, 242, 245, 246; 348/234, 348/251, 353, 365
See application file for complete search history.

(56) References Cited

U.S. PATENT DOCUMENTS

| 6,778,210 | B1 * | 8/2004 | Sugahara et al. | ......... 348/208.4 |
| 2004/0238718 | A1 * | 12/2004 | Washisu | ............... 250/201.2 |
| 2008/0259175 | A1 | 10/2008 | Muramatsu et al. | |

FOREIGN PATENT DOCUMENTS

| JP | 05-167915 | 7/1993 |
| JP | 2002-112100 | 4/2002 |
| WO | WO2007-010891 | 1/2007 |

\* cited by examiner

*Primary Examiner*—Melissa J Koval
*Assistant Examiner*—Autumn Parker
(74) *Attorney, Agent, or Firm*—Harness, Dickey & Pierce, P.L.C.

(57) ABSTRACT

A controller includes a photographing control unit controlling an image pickup unit taking a photograph of an object to perform a short-time photographing operation in which an exposure time is set shorter than a normal exposure time and an image correcting unit acquiring correction information for correcting image data taken in the short-time photographing operation and correcting the image data using the acquired correction information.

9 Claims, 9 Drawing Sheets

CONTROLLER, PHOTOGRAPHING EQUIPMENT, CONTROL METHOD OF PHOTOGRAPHING EQUIPMENT, AND CONTROL PROGRAM

BACKGROUND

1. Technical Field

The present invention relates to a technology of suppressing an influence of a shake at the time of photographing.

2. Related Art

In the past, a variety of methods of avoiding an influence of shake occurring at the time of taking a photograph were suggested. For example, a technology of photographing an image several times and storing the image having the smallest shake among the photographed images (for example, see JP-A-2002-112100).

However, even when an image is taken several times, it could not be said that the shake does not occur under the condition where large shake is generated. Accordingly, a user tried not to shake his or her hands. Therefore, a technique of acquiring a beautiful image by satisfactorily and easily suppressing an influence of shake has been required.

SUMMARY

An advantage of some aspects of the present invention is to easily acquire a beautiful image by satisfactorily suppressing an influence of shake at the time of photographing.

According to an aspect of the invention, there is provided a controller comprising: a photographing unit controlling an image pickup unit taking a photograph of an object to perform a short-time photographing operation in which an exposure time is set shorter than a normal exposure time; and an image correcting unit acquiring correction information for correcting image data taken in the short-time photographing operation and correcting the image data using the acquired correction information.

Here, a short exposure time means a time shorter than a normal exposure time determined to expose the image pickup unit sufficiently to light in consideration of an amount of external light at the time of photographing. The normal exposure time may be determined by the image pickup unit or by the photographing control unit. Alternatively, the normal exposure time may be determined using other methods.

According to the configuration, it is possible to surely suppress the influence of shake by allowing the image pickup unit to take a photograph for a short exposure time. It is possible to reduce the influence of lack of exposure resulting from the short exposure time by correcting the image data and thus to easily obtain a beautiful image without shake.

In the aspect of the invention, the photographing control unit may control the image pickup unit to perform the short-time photographing operation and to perform a normal photographing operation for a normal exposure time, and the image correcting unit may acquire the image data photographed in the normal photographing operation as the correction information. In this case, since the image data photographed for a short time is corrected on the basis of the image data photographed for a normal exposure time, it is possible to surely and naturally correct the image data. For example, when the influence of lack of exposure appears in the image data photographed for a short time, it is possible to surely reduce the influence of lack of exposure by correcting the image data on the basis of the image data photographed for a normal exposure time.

In the aspect of the invention, the image correcting unit may extract brightness information from the image data photographed in the normal photographing operation and may correct the image data on the basis of the brightness information. In this case, since the brightness information having an amount of data smaller than that of the image data can be stored and processed as the correction information, it is possible to reduce memory capacity required for the image correcting unit while retaining the function of surely correcting the image data.

In the aspect of the invention, the controller may further comprise a shake detecting unit detecting an amount of shake of the normal photographing operation. Here, the photographing control unit may perform the normal photographing operation several times by the use of the image pickup unit, and the image correcting unit may acquire the image data of the normal photographing operation, in which the amount of shake detected by the shake detecting unit is the smallest, among the several normal photographing operations as the correction information. In this case, since the correction is performed using the image data having a smallest amount of shake as the correction information, it is possible to surely and naturally correct the image data and thus to obtain natural and beautiful image data without shake.

In the aspect of the invention, the photographing control unit may not allow the subsequent normal photographing operation when the number of photographing operations is greater than a predetermined number. In this case, since the number of photographing times can be restricted at the time of performing the normal photographing operation several times, it is possible to acquire the correction information for a short time.

In the aspect of the invention, the photographing control unit may not allow the subsequent normal photographing operation when the time lapsed after the short-time photographing operation is performed is greater than a predetermined time. In this case, since the image data photographed in a predetermined time after photographing the image data to be corrected is used as the correction information, it is possible to properly and naturally correct the image data.

In the aspect of the invention, the photographing control unit may acquire a difference in photographing direction at the time of normal photographing operation on the basis of the short-time photographing operation and may not allow the subsequent normal photographing operation when the difference departs from a predetermined range. In this case, since the image data having the smaller the difference in photographing direction than that of the image data to be corrected is used as the correction information, it is possible to more properly and naturally correct the image data.

In the aspect of the invention, the photographing control unit may not allow the subsequent normal photographing operation when the amount of shake detected by the shake detecting unit at the time of the normal photographing operation does not depart from a predetermined range. In this case, since the normal photographing operation is not performed after the image data having a small amount of shake and being suitable as the correction information are acquired, it is possible to rapidly acquire the suitable correction information and thus to rapidly obtain beautiful image data having no shake In the aspect of the invention, the photographing control unit may not allow the subsequent normal photographing operation when the amount of shake detected by the shake detecting unit at the time of the normal photographing operation is greater than the amount of shake detected at the time of performing the previous normal photographing operation. In this case, when the amount of shake increases in the course of taking a photograph several times for a normal exposure time, the normal photographing operation is not performed thereafter. Accordingly, since the image data not suitable as the correction information is not photographed, it is possible to acquire the correction information for a short time.

According to another aspect of the invention, there is provided a photographing equipment comprising: an image pickup unit taking a photograph of an object; a photographing control unit controlling the image pickup unit to perform a short-time photographing operation in which an exposure time is set shorter than a normal exposure time; and an image correcting unit acquiring correction information for correcting image data taken in the short-time photographing operation and correcting the image data using the acquired correction information.

According to the above-mentioned configuration, it is possible to satisfactorily suppress the influence of shake by allowing the image pickup unit to take a photograph for a short exposure time. Since the influence of lack of exposure resulting from the short exposure time can be reduced by correcting the image data photographed for the short exposure time, it is possible to easily obtain a beautiful image having no shake.

According to still another aspect of the invention, there is provided a control method of a photographing equipment having an image pickup unit taking a photograph of an object, the method comprising: controlling the image pickup unit to perform a short-time photographing operation in which an exposure time is set shorter than a normal exposure time; and acquiring correction information for correcting image data taken in the short-time photographing operation and correcting the image data using the acquired correction information.

According to still another aspect of the invention, there is provided a control program making a computer serve as: a photographing control unit controlling an image pickup unit taking a photograph of an object to perform a short-time photographing operation in which an exposure time is set shorter than a normal exposure time; and an image correcting unit acquiring correction information for correcting image data taken in the short-time photographing operation and correcting the image data using the acquired correction information.

The invention can be embodied not only as applied to the controller, the photographic equipment, the control method of a photographing equipment, and the control program, but may be also put into practice such that the control program can be downloaded through a telecommunication network or can be stored and distributed in a computer-readable recording medium such as a magnetic recording medium, an optical recording medium, and a semiconductor recording medium Alternatively, the image data may be corrected on the basis of the correction information by allowing the image pickup unit photographing an object to take a photograph and acquiring the correction information for correcting the image data acquired from the photographing operation.

According to this configuration, it is possible to acquire beautiful image data by correcting the image data acquired by the image pickup unit on the basis of the correction information. In addition, by using the brightness information extracted from the image data acquired by the image pickup unit as the correction information, it is possible to reduce the memory capacity required for correcting the image data.

In the controller, the photographing equipment, the control method of the photographing equipment, and the control program according to some aspects of the invention, since the image data having no shake can be acquired by taking a photograph for a short exposure time and the influence of lack of exposure resulting from the short exposure time can be reduced, it is possible to easily acquire a beautiful image having no shake.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the drawings In the first embodiment, the invention is applied to a portable digital camera (hereinafter, simply referred to as "digital cameras") as an example of an electronic apparatus.

Figure 1:
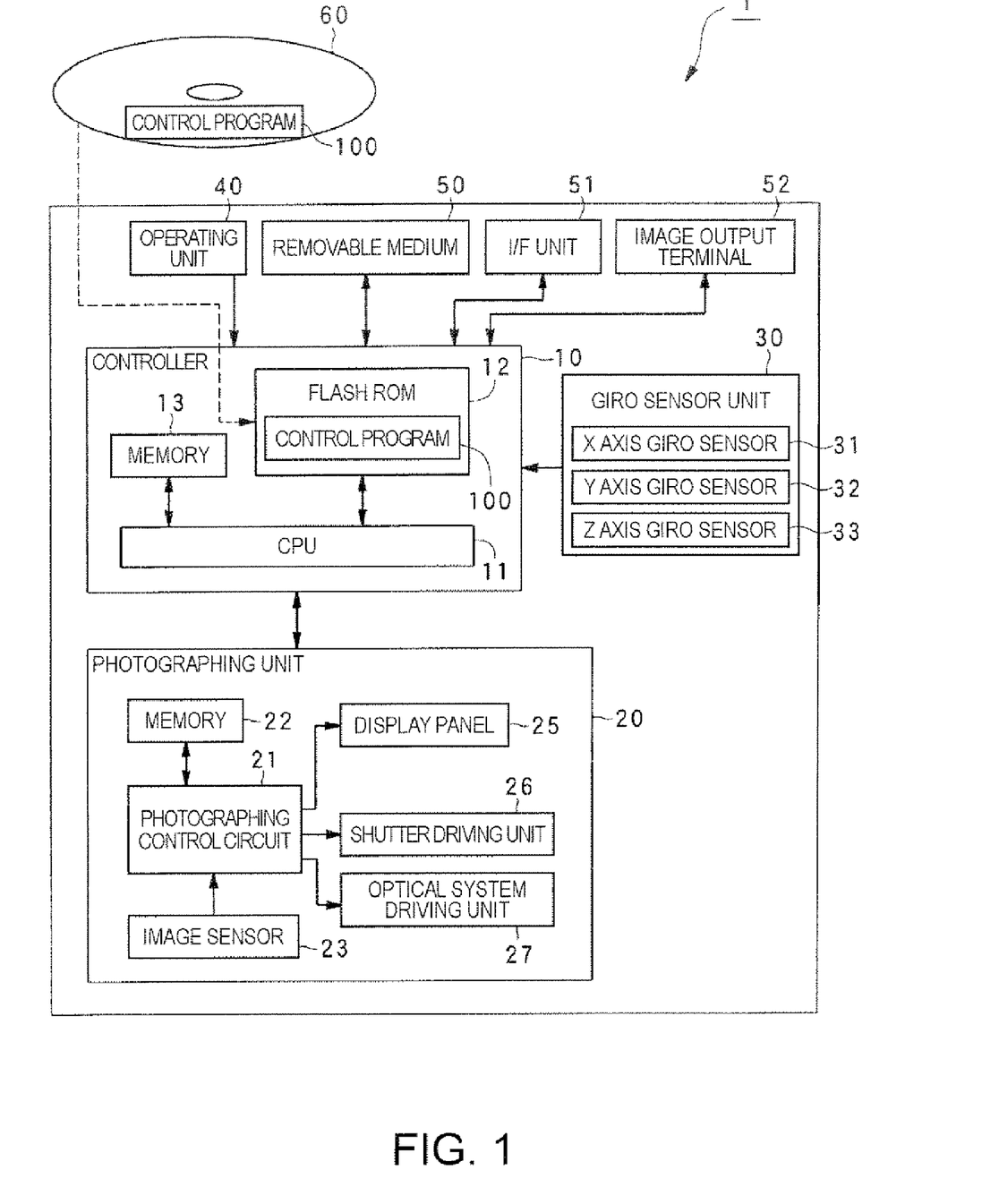
FIG. 1 is a block diagram illustrating a configuration of a digital camera according to a first embodiment of the invention.

FIG. 1 is a block diagram illustrating a configuration of a digital camera 1 (photographing equipment) according to a first embodiment. As shown in FIG. 1, the digital camera 1 includes a controller 10, a photographing unit 20, a gyro sensor unit 30, an operating unit 40, a removable medium 50, an I/F unit 51, and an image output terminal 52.

The controller 10 serves as a control unit controlling the respective units of the digital camera 1 and includes a central processing unit (CPU) 11 executing a variety of programs and performing operations, a rewritable flash read only memory (hereinafter, simply referred to as "ROM") 12 storing a control program 100 executed by the CPU 11 and a variety of data, a memory 13 serving as a work area temporarily storing operations results of the CPU 11 and a variety of data, and a timer circuit 14 counting time. The control program 100 stored in the ROM 12 includes a photographing control program performing a consecutive photographing operation of photographing an image without shake as described later.

The control program 100 can be recorded and distributed in a computer-readable recording medium 60 such as a CD-ROM, a DVD-ROM and a floppy disc (registered trademark). In addition, the digital camera 1 may be communicatably connected to a personal computer through a cable, etc., the control program 100 of the recording medium 60 read out by the personal computer may be output to the digital camera 1, and then the control program 100 may be stored in the flash ROM 12.

The photographing unit 20 has a function of outputting image data of a photographed image obtained by photographing an object and includes a photographing control circuit 21, a memory 22, an image sensor 23, a display panel 25, a shutter driving unit 26, and an optical driving unit 27.

The photographing control circuit 21 serves to control elements of the photographing unit 20 under the control of the controller 10. The memory 22 temporarily stores a variety of information such as image data processed by the photographing control circuit 21.

The image sensor 23 is an image sensor in which photoelectric conversion elements such as charge coupled devices (CCD) and complementary metal oxide semiconductors (CMOS) are arranged in a two-dimensional matrix or in a honeycomb shape and includes an A/D conversion circuit (not shown) together. The image sensor 23 converts analog signals generated from the photoelectric conversion elements into digital data and sequentially outputs image data to the photographing control circuit 21 at a predetermined sampling rate.

The display panel 25 displays a variety of information such as the photographed image photographed by the image sensor 23 and a setting picture under the control of the photographing control circuit 21 and includes a flat display panel such as a liquid crystal display panel and an organic electroluminescence (EL) panel.

The shutter driving unit 26 drives a mechanical shutter (not shown) shielding the image sensor 23 from external light and exposes the image sensor 23 to light for a predetermined exposure time under the control of the photographing control circuit 21.

The optical driving circuit 27 serves to drive a lens group (not shown) constituting an optical system along with the image sensor 23 and an iris mechanism (not shown) to adjust a zoom, a focus, and an iris.

The operating unit 40 includes a plurality of operating elements such as a power supply switch turning on and off the digital camera 1 and a shutter switch instructing execution of a photographing operation, which are operated by a user, and generates an operation signal indicating the operating details at the time of operating the operating elements and outputs the generated operation signal to the controller 10. The operating unit 40 may detect the operation of a touch panel formed integrally with the display panel 25.

The removable medium 50 serves to store moving picture data photographed by the photographing unit 20 and includes a disc-type recording medium on which information can be optically or magnetically recorded and a card-type recording medium employing semiconductor memory elements.

The I/F unit 51 is an interface having a connector and the like for connecting the digital camera 1 to an external apparatus (for example, a personal computer or a printer) of the digital camera 1 through a cable or the like. For example, when the image data stored in the removable medium 50 are output to the personal computer, the image data are output to the personal computer through the I/F unit 51.

The image output terminal 52 is a terminal for outputting moving picture signals to an external display apparatus such as a television and a projector. The digital camera 1 includes an audio circuit for receiving, recording, and reproducing voice signals and a voice output terminal for outputting the voice signals to an external speaker or an external amplifier, in addition to the above-mentioned constituent elements.

In the digital camera 1 having the above-mentioned configuration, when the shutter switch of the operating unit 40 is operated, an optical system is driven by the optical system driving unit 27 to adjust the zoom, the focus, and the iris and the mechanical shutter is driven by the shutter driving unit 26 to expose the image sensor 23 to light. As a result, image data are input to the photographing control circuit 21 from the image sensor 23. The photographing control circuit 21 acquires the image data input from the image sensor 23 and temporarily stores the acquired image data in the memory 22. The photographing control circuit 21 displays the photographed image on the display panel 25 on the basis of the image data stored in the memory 22.

The photographing control circuit 21 encodes the image data stored in the memory 22, converts the encoded image data into a predetermined data format such as JPEG (Joint photographic Experts Group), and outputs the converted image data to the controller 10. The controller 10 records the image data input from the photographing unit 20 on the removable medium 50.

Of course, the digital camera 1 may adjust the zoom, the focus, and the Like by the use of the optical system driving unit 27 at the time point before the shutter switch of the operating unit 40 is operated.

The gyro sensor unit 30 of the digital camera 1 has a function of detecting the amount of shake during operation of the digital camera 1. specifically, the gyro sensor unit 30 includes an X axis gyro sensor 31, a Y axis gyro sensor 32, and a Z axis gyro sensor 33.

The X axis gyro sensor 31 detects a rotation about an axis (hereinafter, referred to as X axis) set in the width direction of an image pickup surface of the image sensor 23. The Y axis gyro sensor 32 detects a rotation about an axis (hereinafter, referred to as Y axis) set in the height direction of the image pickup surface of the image sensor 23. The Z axis gyro sensor 33 detects a rotation about an axis (hereinafter, referred to as Z axis) set in the direction perpendicular to an image pickup surface of the image sensor 23. The gyro sensors 31, 32, and 33 output angular speed detection signals with voltage values corresponding to angular speeds to the controller 10 when they detect the rotations.

The controller 10 receives the angular speed detection signals of the gyro sensors 31, 32, and 33, calculates the amounts of shake about the X, Y, and Z axes, and stores the calculated amounts of shake in the memory 22 together with the image data as described later.

The calculation of the amount of shake will be briefly described. The controller 10 calculates an angular speed (rad/sec) on the basis of the angular speed detection signal and integrates the angular speed (rad/sec) with an exposure time (sec) at the time of photographing to calculate a movement angle θ (rad).

The controller 10 calculates the amount of shake in the number of pixels (dot) on the basis of the movement angle θ (rad). That is, when a focal length is L, an image angle is α, and the image angle α is still greater than the movement angle θ, Expression (1) is established between the amount of shake K (dot) and the movement angle θ:

$$\text{Amount of shake } K \text{ (dot)} = \text{movement angle } \theta \times \text{correction coefficient } r \quad (1)$$

where the correction coefficient $r = \text{focal length } L \times (1 + \tan^2(\alpha/2))$.

The controller 10 calculates the amounts of shake with respect to the X, Y, and Z axis on the basis of Expression (1) every time the photographing unit 20 takes a photograph. Here, when the zoom power at the time of photographing is a value other than one time, the focal length L can be corrected in accordance with the value.

Due to individual difference between the gyro sensors 31, 32, and 33, the voltage value of the angular speed detection signal varies when the angular speed (rad/sec) is zero. Accordingly, in the first embodiment, the average value is set as a zero-point voltage value by sampling the angular speed detection signal of the gyro sensors 31, 32, and 33 after the main body is turned on and before the photographing operation is started. At this time, the controller 10 calculates a plurality of zero-point voltage values for a predetermined time and sets the average value of the zero-point voltage values as an actual zero-point voltage value when the zero-point voltage values of which a difference from the average value of the zero-point voltage value is smaller than a predetermined value is obtained greater than a predetermined ratio (for example, 99%). Accordingly, the zero-point voltage value can be set when the main body is in a stationary state.

The digital camera 1 having the above-mentioned configuration consecutively taking a photograph several times, performs a first photographing operation among the several photographing operations as a short-time photographing operation having a short exposure time, and performs at least one photographing operation as a normal photographing operation having a proper exposure time corresponding to the amount of external light incident on the image sensor 23.

The amount of shake generated at the time of taking a photograph corresponds to the amount of movement of the digital camera 1 for the time when the image sensor 23 is exposed to light as described above, that is, the integration value of angular speeds. Accordingly, when the exposure time gets short, the integration value of angular speeds, that is, the amount of shake, is reduced in the case where the digital camera 1 is shaken at the time of taking a photograph, thereby obtaining image data having no shake.

However, when the photographing operation is performed for a short exposure time, the image data photographed in consideration of the lack of exposure becomes lack of brightness. Accordingly, the digital camera 1 performs a normal photographing operation for a proper exposure time corresponding to the intensity of external light along with the short-time photographing operation, extracts the brightness data (brightness information) from the image data acquired from the normal photographing operation, and corrects the brightness of the image data acquired from the short-time photographing operation on the basis of the brightness data. The correction reduces the influence of lack of exposure in the image data acquired from the short-time photographing operation, thereby acquiring beautiful image data.

Here, the process of extracting the brightness data from the image data is a process of separating color information of the image data into information indicating brightness and information indicating colors (or color difference) and taking out only the information indicating brightness. In this process, the controller 10 serves as a controller, the CPU 11 serves as a photographing control unit, and the image correcting unit, the photographing unit 20 serves as an image pickup unit, and the gyro sensor unit 30 serves as a shake detecting unit in cooperation with the CPU 11.

Now, this process will be described in detail.

Figure 2:
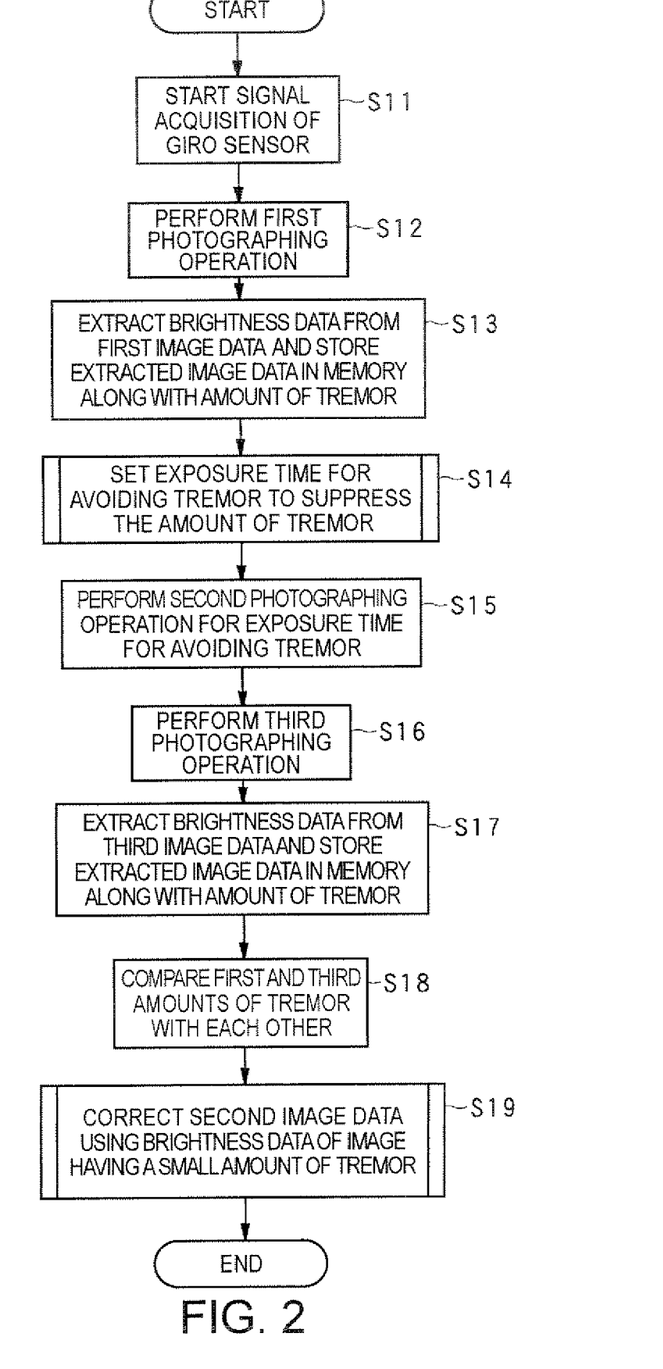
FIG. 2 is a flowchart illustrating a consecutive photographing operation of the digital camera

FIG. 2 is a flowchart illustrating the consecutive photographing operation performed by the digital camera 1.

When the shutter switch of the operating unit 40 is operated and the consecutive photographing operation shown in FIG. 2 is started, the controller 10 starts introduction of the angular speed detection signal input from the gyro sensors 31, 32, and 33 of the gyro sensor unit 30 and calculation of the amounts of shake about the x, Y, and Z axes on the basis of the introduced angular speed detection signals (step S11).

Subsequently, the controller 10 controls the photographing control circuit 21 to perform a first photographing operation. That is, the photographing control circuit 21 controls the optical system driving unit 27 to adjust the focus and the zoom, calculates a proper exposure time corresponding to an external light quantity incident on the image sensor 23, drives the mechanical shutter with the shutter driving unit 26 in accordance with the exposure time to expose the image sensor 23 to the external light, and receives the image data output from the image sensor 23 (step S12). The first photographing operation corresponds to the normal photographing operation.

Subsequently, the controller 10 temporarily stores the image data acquired by the photographing control circuit 21 in the first photographing operation in the memory 13, extracts the brightness data from the image data to acquire the amount of shake in the exposure time of the first photographing operation, and stores the brightness data and the amount of shake in the memory 13 (step S13).

Here, the controller 10 sets an exposure time for avoiding shake to suppress the influence of shake to the photographing unit 20 (step S14). The exposure time for avoiding shake means an exposure time when no shake occurs or a very small amount of shake occurs and a time shorter than the proper exposure time corresponding to the intensity of external light. Thereafter, the photographing control circuit 21 performs a second photographing operation for the exposure time for avoiding shake (step S15). The second photographing operation corresponds to the short-time photographing operation.

The controller 10 controls the photographing control circuit 21 to perform a third photographing operation for a normal exposure time (step S16). The third photographing operation corresponds to the normal photographing operation. The controller 10 extracts the brightness data from the image data acquired from the third photographing operation and stores the extracted brightness data along with the amount of shake in the exposure time of the third photographing operation in the memory 13 (step S17).

Then, the controller 10 compares the amounts of shake of the first and third photographing operations stored in the memory 13 with each other and determines the smaller amount of shake as the correcting image data (step S18). Subsequently, the controller 10 corrects the image data of the second photographing operation by using the brightness data extracted from the correcting image data (step S19) and then ends the procedure.

Figure 3:
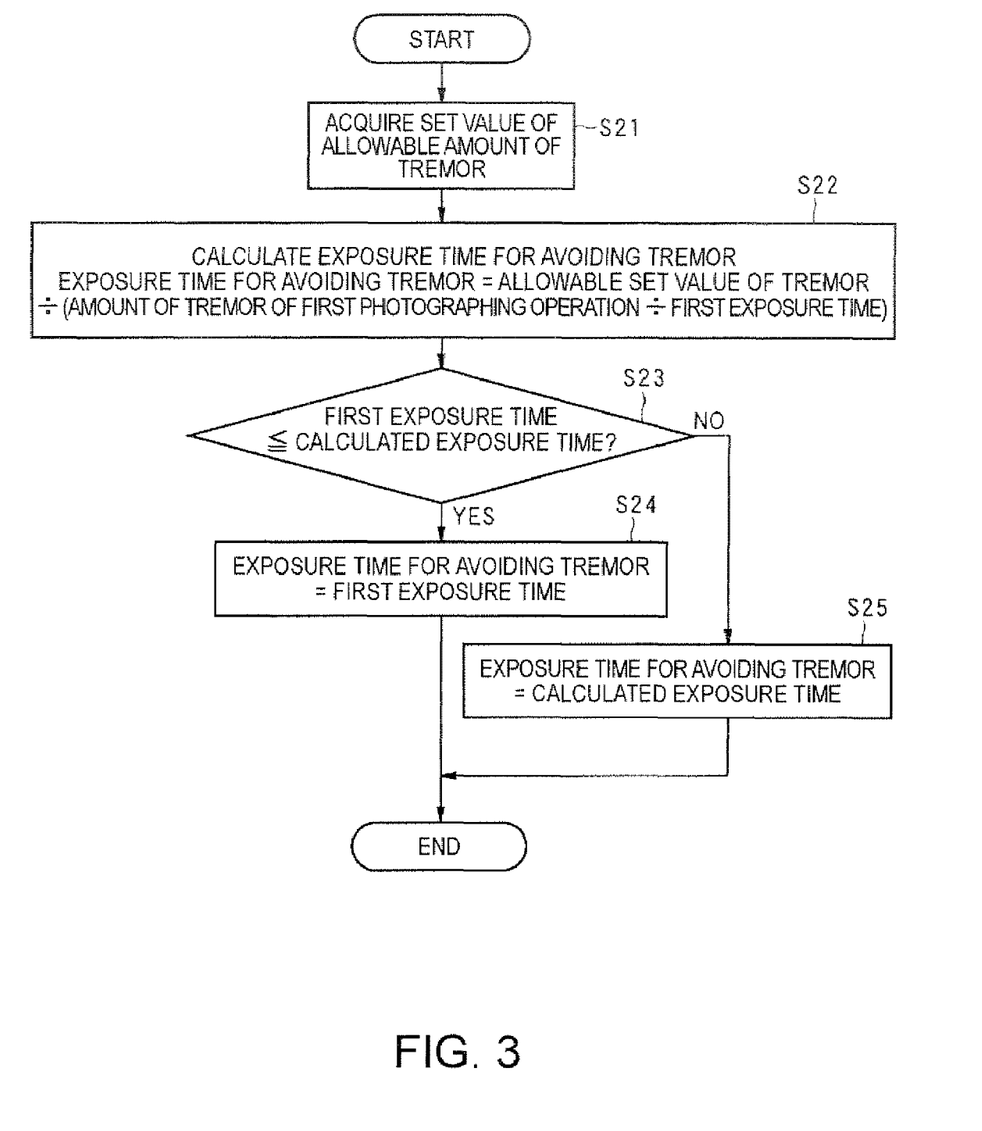
FIG. 3 is a flowchart illustrating in detail a process of setting a shake avoiding exposure time.

FIG. 3 is a flowchart illustrating in detail the process performed in step S14 in FIG. 2. In the process shown in FIG. 3, the controller 10 first acquires the set value of an allowable amount of shake (step S21). The set value of the allowable amount of shake is a value set in advance by the controller 10. When the amount of shake in the photographing operation is smaller than the set value, no or little shake is visible in the image data and thus the image data is recognized as excellent image data. In other words, the set value of the allowable amount of shake is a value as a limit value of the allowable amount of shake as the excellent image data.

Subsequently, the controller 10 calculates the exposure time for avoiding the shake on the basis of the set value acquired in step S21 (step S22). In step S22, the exposure time for avoiding the shake is calculated from the operating process indicated by Expression (2).

Set value of allowable amount of shake÷(amount of shake of first photographing operation÷first exposure time) (2)

The controller 10 compares the exposure time calculated in step S22 with the exposure time of the first photographing operation (step S23). The process of shortening the exposure time or the like is not performed in the first photographing operation. Accordingly, the exposure time of the first photographing operation corresponds to the intensity of external light incident on the image sensor 23.

When the exposure time of the first photographing operation is shorter than, or the exposure time of the first photographing operation is equal to, the exposure time calculated in step S22 (step S23: YES), the controller 10 sets the exposure time of the first photographing operation as the exposure time for avoiding the shake (step S24) and then performs step S15 shown in FIG. 2.

When the exposure time calculated in step S22 is shorter than the exposure time of the first photographing operation (step S23: NO), the controller 10 sets the exposure time calculated in step S22 as the exposure time for avoiding the shake (step S25) and then performs step S15 shown in FIG. 2.

By the process shown in FIG. 3, the shorter exposure time of the exposure time of the first photographing operation and the exposure time calculated on the basis of the set value of the allowable amount of shake is set as the exposure time for avoiding the shake.

When the exposure time of the first photographing operation is set as the exposure time for avoiding the shake in step S15, it is possible to suppress the influence of shake by performing the photographing operation for the normal exposure time set to correspond to the intensity of external light. In this case, the image data may not be corrected in step S19 (FIG. 2).

Figure 4:
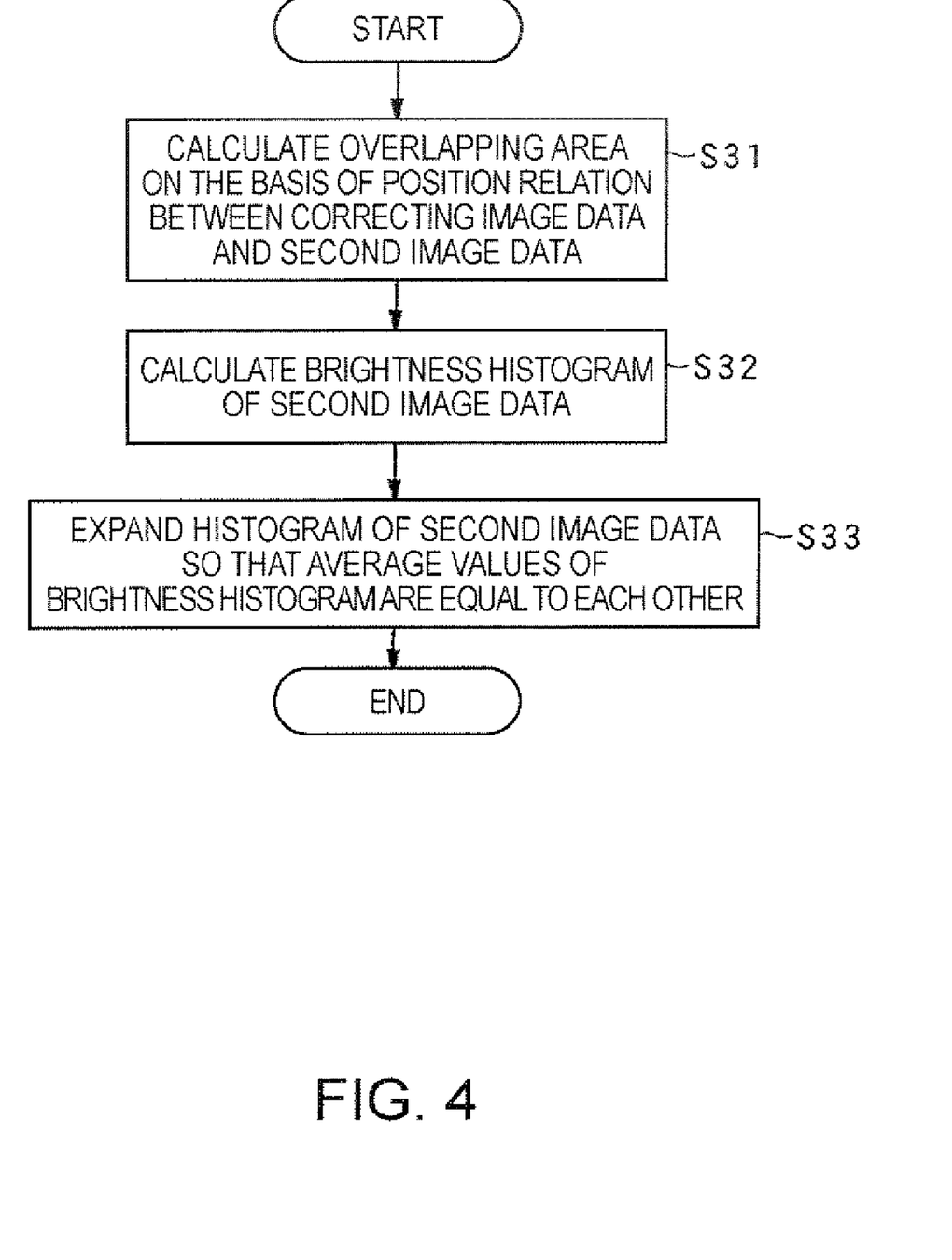
FIG. 4 is a flowchart illustrating in detail a process of correcting image data.

FIG. 4 is a flowchart illustrating in more detail the process performed in step S19 of FIG. 2.

As shown in FIG. 4, the controller 10 acquires an overlapping area by comparing the correcting image data with the second image data (step S31). The overlapping area means a portion in which the same object is taken in both image data.

Subsequently, the controller 10 acquires brightness histograms of the overlapping area in the correcting image data and the second image data (step S32).

The controller 10 corrects the brightness of the second image data by expanding the histogram of the entire second image data so that the average value of the brightness histogram of the second image data and the average value of the brightness histogram of the correcting image data are equal to each other in the overlapping area (step S33).

In the process of acquiring the overlapping area where the correcting image data overlaps the second image data in step S31, for example, by acquiring signal values output from the gyro sensor unit 30 at the time of taking a photograph for the correcting image data and at the time of performing the second photographing operation and calculating the amount of movement of the digital camera 1 between the time of performing the second photographing operation and the time of taking a photograph for the correcting image data, the overlapping area may be acquired on the basis of the amount of movement. The overlapping area may be acquired by performing an image process such as an edge comparison to the correcting image data and the second image data.

Figure 5A:
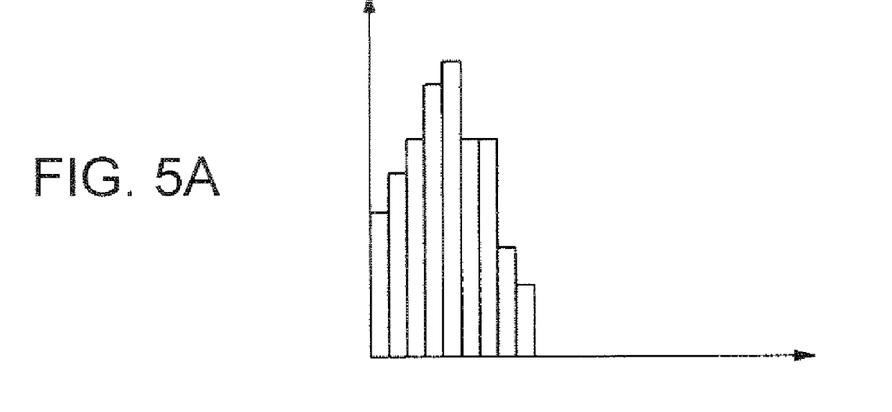
FIGS. 5A and 5B are diagrams illustrating a variation in brightness histogram accompanied with the correction of image data.
Figure 5B:
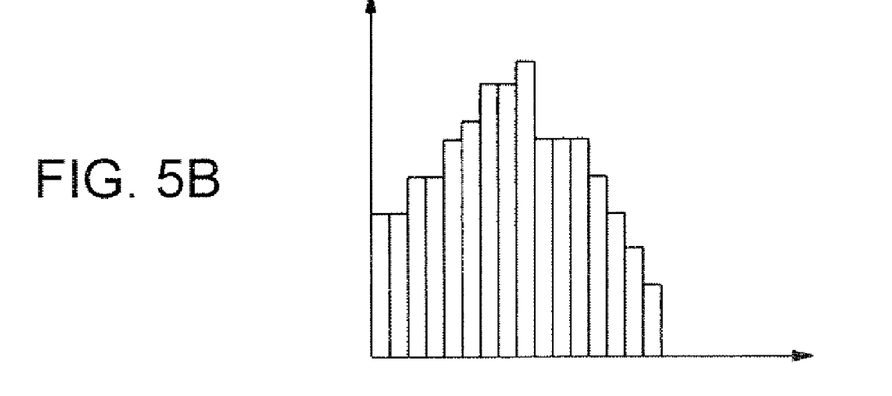

FIGS. 5A and 5B are diagrams illustrating a variation of the brightness histogram accompanied with the process shown in FIG. 4, where FIG. 5A illustrates the brightness histogram before the correction and FIG. 5B illustrates the brightness histogram after the correction. The diagrams of FIGS. 5A and 5B show only a typical example and does not limit the scope of the invention.

FIG. 5A is a typical example of the brightness histogram when the second image data is lack of exposure when the brightness histogram is expanded to correspond to the brightness histogram of the image data photographed for a sufficient exposure time, the brightness data are greatly varied as shown in FIG. 5B and thus is corrected to preferable brightness. The correction is performed with respect to the brightness histogram of the area where the second image data and the correcting image data overlap with each other since the correction result is reflected in the entire image data, the corrected image data become image data having sufficient brightness as in case of taking a photograph for a preferable exposure time.

According to the first embodiment of the invention, since the image data photographed by the photographing unit 20 for a short exposure time are corrected on the basis of the image data photographed for a normal exposure time, the corrected image data become image data having a very small amount of shake or little shake. That is, by shortening the exposure time, the amount of shake is suppressed in a very small amount even when shake occurs in the course of exposure. It is possible to reduce the influence of lack of exposure resulting from the short exposure time by performing the correction. Accordingly, it is possible to easily obtain a beautiful image having no shake.

Since the brightness data extracted from the image data photographed for the normal exposure time is used to perform the correction, it is possible to surely and naturally correct the image data and to keep the brightness data having a capacity smaller than that of the image data.

In the first embodiment, since the brightness data extracted from the image data having the smaller amount of shake of the image data acquired from the first and third photographing operations are used to perform the correction, it is possible to surely and naturally correct the image data and to acquire natural and beautiful image data by surely excluding the influence of shake, For example, by expanding the histogram (FIG. 4) as the process of correcting the image data, the brightness of the image data photographed with the short exposure time can be corrected surely at a high speed.

Although it has been described with reference to FIG. 4 that the brightness histogram of the entire second image data is expanded so that the average value of the brightness histogram of the second image data and the average value of the brightness histogram of the correcting image data are equal to each other in the overlapping area (step S33), the method of correcting the brightness of the image data is not limited to it. For example, the correction may be performed so that the correcting image data and the brightness histogram are equal to each other by using the center value of the brightness histogram of the second image data as a reference. The process of acquiring the area in which the second image data and the correcting image data overlap with each other is not limited to the above-mentioned method.

Second Embodiment

Figure 6:
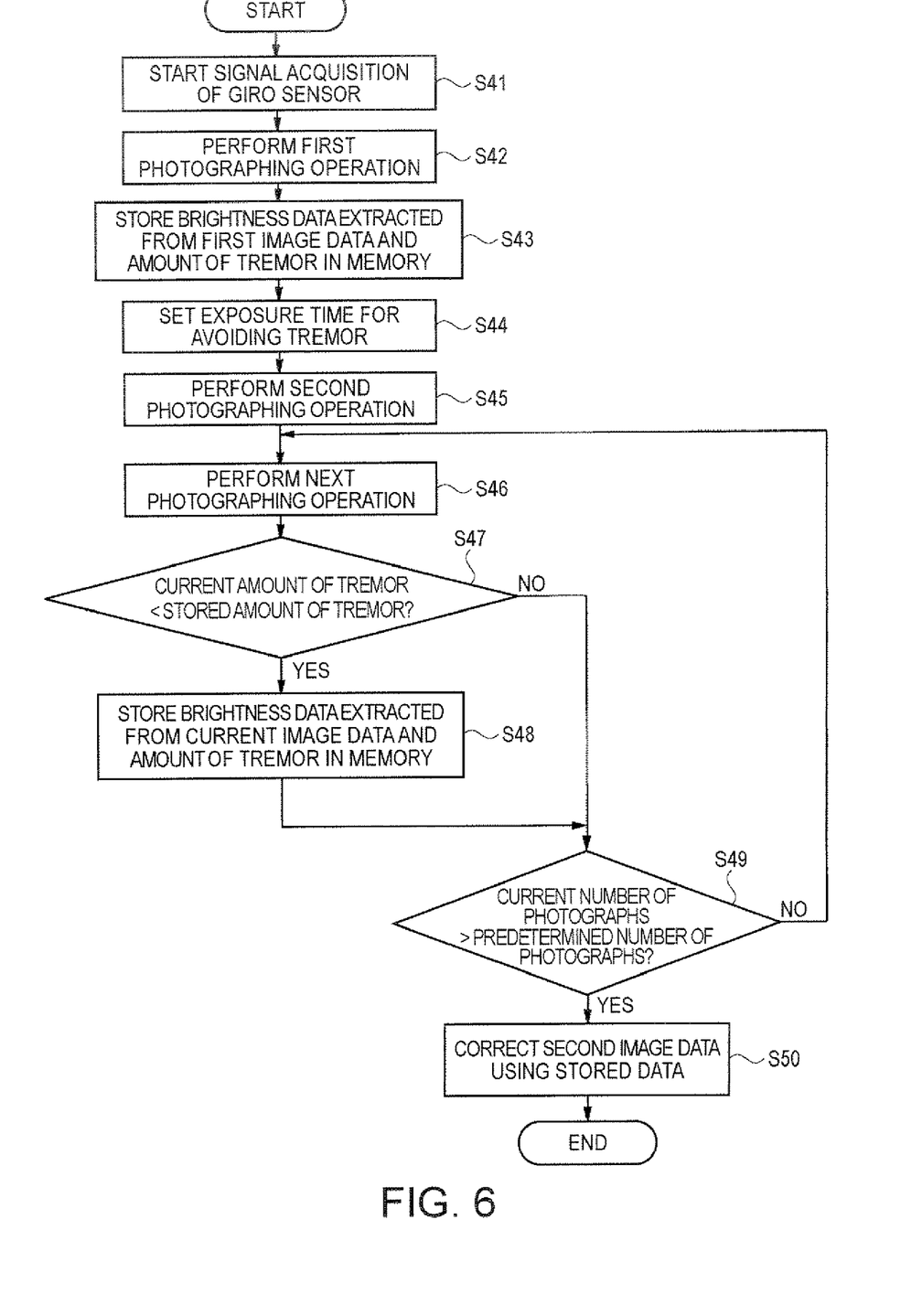
FIG. 6 is a flowchart illustrating a consecutive photographing operation of a digital camera according to a second embodiment of the invention.

FIG. 6 is a flowchart illustrating a consecutive photographing operation of a digital camera 1 according to a second embodiment of the invention.

In the second embodiment, since the digital camera 1 has the same configuration as the digital camera 1 according to the first embodiment, the constituent elements of the digital camera 1 are denoted by the same reference numerals and are not shown and described.

The consecutive photographing operation shown in FIG. 6 is performed instead of the consecutive photographing operation (FIG. 2) in the first embodiment. In the second embodiment, an example of consecutively performing the photographing operation up to a predetermined number of photographs and correcting the image data on the bass of the brightness data extracted from the image data having a small amount of shake in the consecutive photographing operation will be described.

In the second embodiment, the photographing operations subsequent to the first and the third photographing operations correspond to the normal photographing operation and the second photographing operation corresponds to the short-time photographing operation.

When the shutter switch of the operating unit 40 is operated and the consecutive photographing operation shown in FIG. 6 is started, the controller 10 starts introduction of the angular speed detection signal input from the gyro sensors 31, 32, and 33 of the gyro sensor unit 30 and calculation of the amounts of shake about the X, Y, and z axes on the basis of the introduced angular speed detection signals (step S41).

Subsequently, under the control of the controller 10, the first photographing operation is performed by the photographing control circuit 21 and the image data are introduced (step S42). The controller 10 extracts the brightness data from the image data introduced in the first photographing operation and stores the brightness data along with the amount of shake for the exposure time of the first photographing operation in the memory 13 (step S43).

Next, the controller 10 sets the exposure time for avoiding the shake to suppress the influence of shake to the photographing unit 20 (step S44). The process of setting the exposure time for avoiding the shake in step S44 is similar to the process (FIG. 3) described in the first embodiment Thereafter, under the control of the photographing control circuit 21, the second photographing operation is performed with the exposure time for avoiding the shake (step S45)

Subsequently, the controller 10 performs the next photographing operation for the normal exposure time (step S46) and compares the amount of shake stored along with the brightness data in the memory 13 with the amount of shake of the photographing operation (step S47). Here, when the amount of shake stored in the memory 13 is larger than the amount of shake of the photographing operation in step S46 (step S47: YES), the controller 10 extracts the brightness data from the image data photographed in step S46, stores the brightness data and the amount of shake of the photographing operation in step S46 in the memory 13 to correlate with each other (step S48) and then performs step S49.

When the amount of shake of the photographing operation in step S46 is larger than the amount of shake stored in the memory 13 (step S47: NO), the controller 10 performs step S49.

In step S49, the controller 10 judges whether the current number of photographs is greater than the predetermined number of photographs. When it is not greater than the predetermined number of photographs, the controller performs again step S46 and when it is greater than the predetermined number of photographs, the controller performs step S50.

In step S50, the controller 10 corrects the image data of the second photographing operation by using the brightness data extracted from the correcting image data and ends the procedure. The process of correcting the image data in step S50 is similar to the process (FIG. 4) described in the first embodiment.

According to the second embodiment, in addition to the effects which can be obtained with the configuration similar to the first embodiment, it is possible to acquire the correcting image data for a short time, since the number of photographing operations performed by the photographing unit 20 for the normal exposure time can be restricted. Since the brightness data extracted from the image data having the smaller amount of shake of the image data acquired through a plurality of photographing operations are stored in the memory 13 and are used for correction, it is possible to surely and naturally correct the image data.

Third Embodiment

Figure 7:
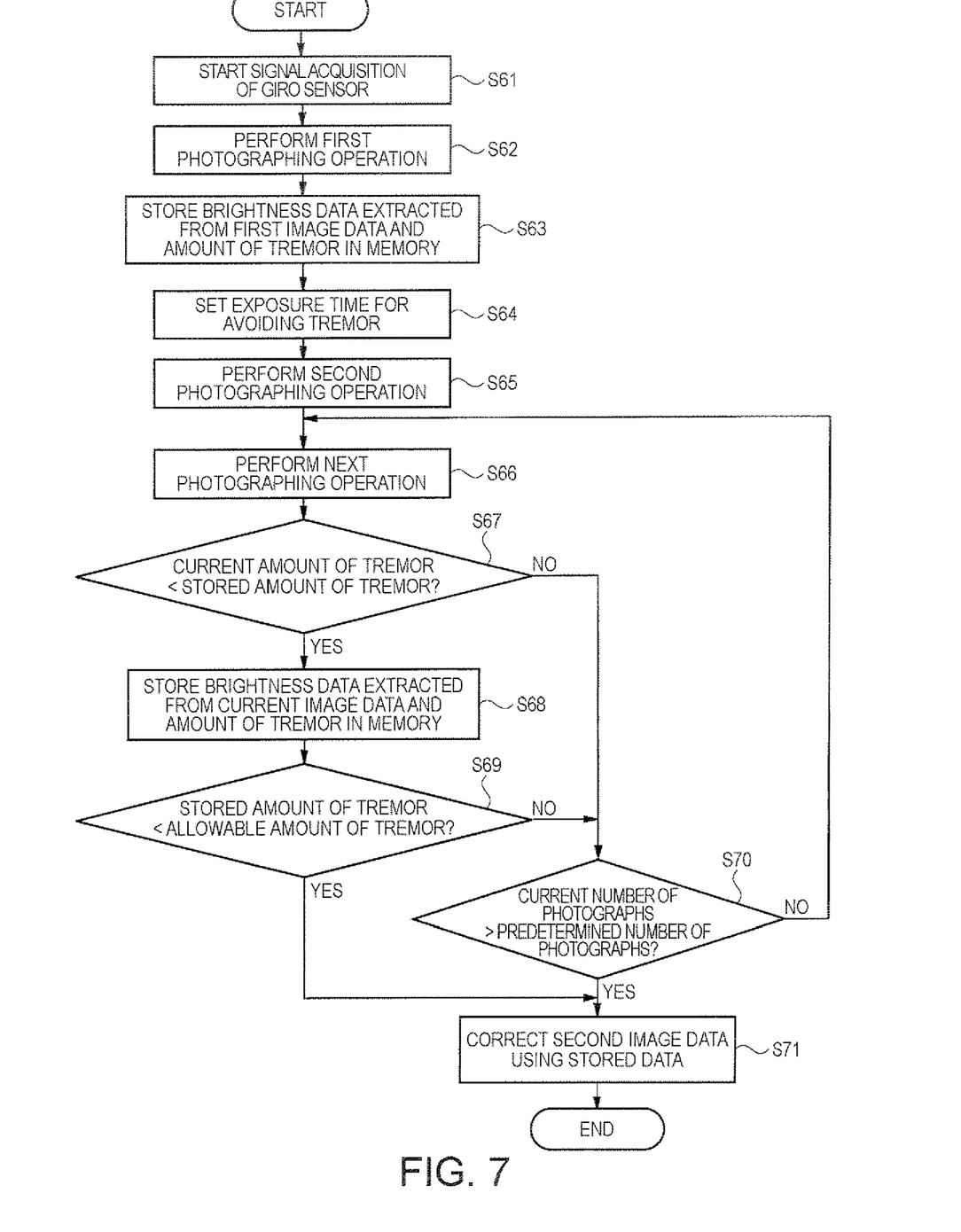
FIG. 7 is a flowchart illustrating a consecutive photographing operation of a digital camera according to a third embodiment of the invention.

FIG. 7 is a flowchart illustrating a consecutive photographing operation of a digital camera 1 according to a third embodiment of the invention.

In the third embodiment, since the digital camera 1 has the same configuration as the digital camera 1 according to the first embodiment, the constituent elements of the digital camera 1 are denoted by the same reference numerals and are not shown and described.

The consecutive photographing operation shown in FIG. 7 is performed instead of the consecutive photographing operation (FIG. 2) in the first embodiment. In the third embodiment, an example of correcting the image data on the basis of the brightness data extracted from the image data in case of photographing the image data with the amount of shake smaller than the predetermined allowable amount of shake will be described.

Here, the allowable amount of shake is a threshold value in which the amount of shake at the time of photographing the image data from which the correcting brightness data extracted should be smaller than the allowable amount of shake.

In the third embodiment, the first and the third photographing operations correspond to the normal photographing operation and the second photographing operation corresponds to the short-time photographing operation.

When the shutter switch of the operating unit 40 is operated and the consecutive photographing operation shown in FIG. 7 is started, the controller 10 starts introduction of the angular speed detection signal input from the gyro sensors 31, 32, and 33 of the gyro sensor unit 30 and calculation of the amounts of shake about the X, Y, and z axes on the basis of the introduced angular speed detection signals (step S61).

Subsequently, under the control of the controller 10, the first photographing operation is performed by the photographing control circuit 21 and the image data are introduced (step S62). The controller 10 extracts the brightness data from the image data introduced in the first photographing operation and stores the brightness data along with the amount of shake for the exposure time of the first photographing operation in the memory 13 (step S63).

Next, the controller 10 sets the exposure time for avoiding the shake to suppress the influence of shake to the photographing unit 20 (step S64). The process of setting the exposure time for avoiding the shake in step S64 is similar to the process (FIG. 3) described in the first embodiment.

Thereafter, under the control of the photographing control circuit 21, the second photographing operation is performed with the exposure time for avoiding the shake (step S65).

Subsequently, the controller 10 performs the following photographing operation with the normal exposure time (step S66) and compares the amount of shake of this photographing operation with the amount of shake stored in the memory 13 along with the brightness data (step S67).

Here, when the amount of shake of the photographing operation in step S66 is equal to or greater than the amount of shake stored in the memory 13 (step S67: NO), the controller 10 performs step S70.

When the amount of shake stored in the memory 13 is greater than the amount of shake of the photographing operation in step S66 (step S67: YES), the controller 10 extracts the brightness data from the image data photographed, in step S66 and stores the brightness data and the amount of shake of the photographing operation in step S66 in the memory 13 so as to correspond to each other (step S68). Subsequently, the controller 10 judges whether the amount of shake stored in the memory 13 is smaller than the predetermined allowable amount of shake (step S69). When it is smaller than the allowable amount of shake stored in the memory 13, the controller corrects the image data photographed in step S65 by using the brightness data stored in the memory 13 (step S71) and ends the procedure. The process of correcting the image data in step S71 is similar to the process (FIG. 4) described in the first embodiment.

On the other hand, in step 67, when the amount of shake of the photographing operation in step S66 is equal to or greater than the amount of shake stored in the memory 13, and in step S69, the amount of shake stored in memory 13 is equal to or greater than the allowable amount of shake, the controller 10 judges whether the current number of photographs is greater than the predetermined number of photographs (step S70).

When the current number of photographs is not greater than the predetermined number of photographs (step S70: NO), the controller 10 resumes the photographing operation in step S66 again and when the current number of photographs is greater than the predetermined number of photographs (step S70: YES), the controller corrects the image data using the brightness data stored in the memory 13 in step S71.

According to the third embodiment, in addition to the advantages which can be obtained with the configuration similar to the first and second embodiments, it is possible to perform a correction using excellent image data and to rapidly acquire a beautiful image without shake, since the photographing operation is ended and the image data are corrected when the amount of shake in performing the photographing operation for the normal exposure time is in the allowable range of shake.

Although it has been described in the second and third embodiments that the total number of photographs including all the photographing operations from the first photographing operation in the consecutive photographing operation is compared with the predetermined number of photographs, the number of photographs other than the second photographing operation corresponding to the short-time photographing operation may be compared with the predetermined number of photographs. When the number of short-time photographing operations in the consecutive photographing operation shown in FIGS. 6 and 7 is predetermined, it is possible to easily acquire the number of normal photographing operations by subtracting the number of short-time photographing operations from the total number of photographing operations. Accordingly, it can be arbitrarily determined whether the predetermined number of photographing operations restricts the total number of photographing operations or the number of normal photographing operations and the same advantage can be obtained in any case.

Fourth Embodiment

Figure 8:
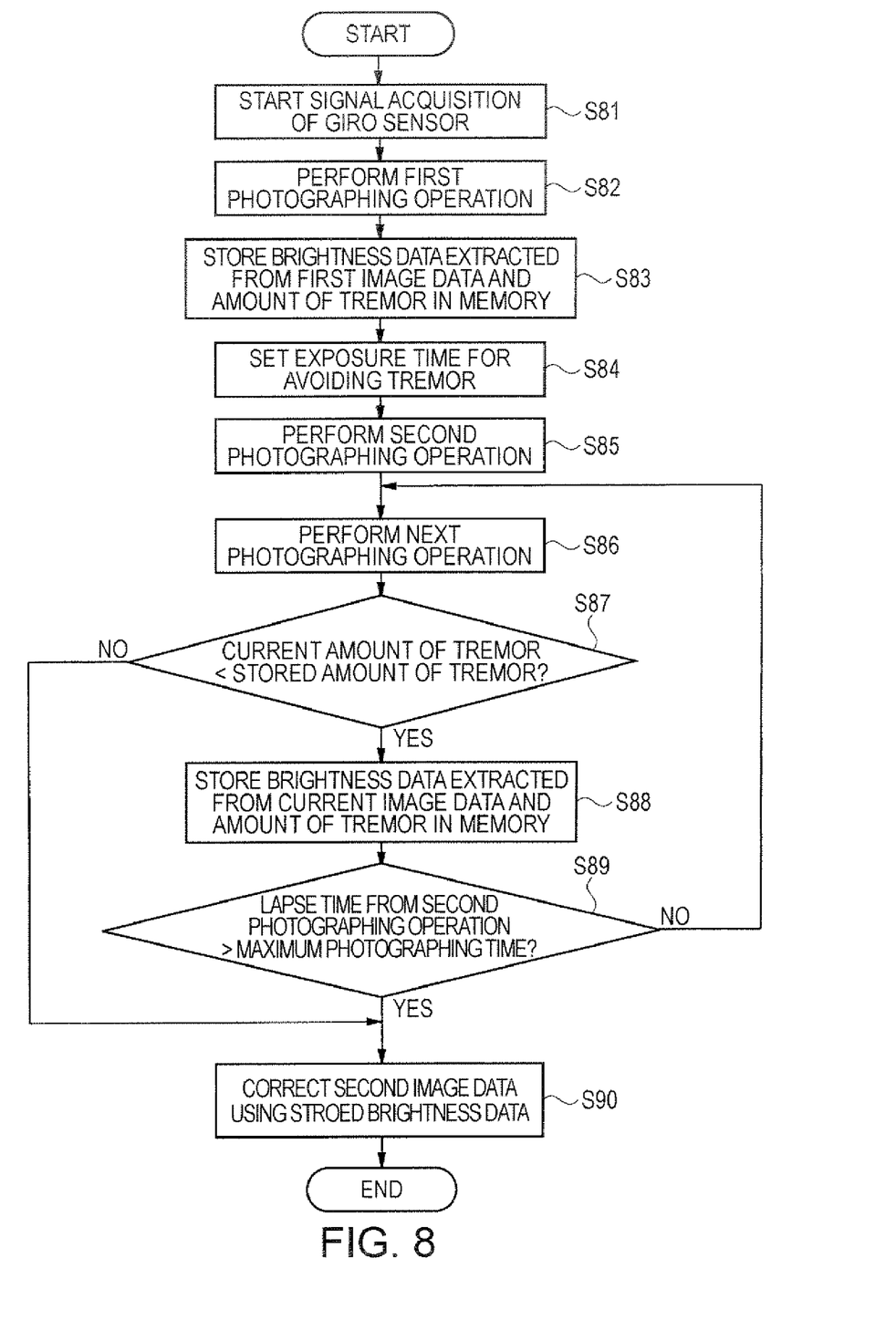
FIG. 8 is a flowchart illustrating a consecutive photographing operation of a digital camera according to a fourth embodiment of the invention.

FIG. 8 is a flowchart illustrating a consecutive photographing operation of a digital camera 1 according to a fourth embodiment of the invention.

In the fourth embodiment, since the digital camera 1 has the same configuration as the digital camera 1 according to the first embodiment, the constituent elements of the digital camera 1 are denoted by the same reference numerals and are not shown and described.

The consecutive photographing operation shown in FIG. 8 is performed instead of the consecutive photographing operation (FIG. 2) in the first embodiment. In the fourth embodiment, an example of performing a photographing operation with a short exposure time and a photographing operation with a normal exposure time plural times in the consecutive photographing operation, extracting the brightness data from the image data having the smallest amount of shake among the photographing operations with the normal exposure time, correcting the image data will be described. In the fourth embodiment, the time lapsing after the photographing operation with the short exposure time is performed every time performing the photographing operation with the normal exposure time and ends when the lapsing time is greater than a predetermined time. In the fourth embodiment, the amount of shake is calculated every time performing the photographing operation with the normal exposure time and ends the photographing operation when the amount of shake tends to increase In the fourth embodiment, the photographing operations subsequent to the first and the third photographing operations correspond to the normal photographing operation and the second photographing operation corresponds to the short-time photographing operation.

When the shutter switch of the operating unit 40 is operated and the consecutive photographing operation shown in FIG. 7 is started, the controller 10 starts introduction of the angular speed detection signal input from the gyro sensors 31, 32, and 33 of the gyro sensor unit 30 and calculation of the amounts of shake about the X, Y, and z axes on the basis of the introduced angular speed detection signals (step S81).

Subsequently, under the control of the controller 10, the first photographing operation is performed by the photographing control circuit 21 and the image data are introduced (step S82). The controller 10 extracts the brightness data from the image data introduced in the first photographing operation and stores the brightness data along with the amount of shake for the exposure time of the first photographing operation in the memory 13 (step S83).

Next, the controller 10 sets the exposure time for avoiding the shake to suppress the influence of shake to the photographing unit 20 (step S84). The process of setting the exposure time for avoiding the shake in step S84 is similar to the process (FIG. 3) described in the first embodiment.

Thereafter, under the control of the photographing control circuit 21, the second photographing operation is performed with the exposure time for avoiding the shake (step S85).

Subsequently, the controller 10 performs the following photographing operation with the normal exposure time (step S86) and compares the amount of shake of this photographing operation with the amount of shake stored in the memory 13 along with the brightness data (step S87).

Here, when the amount of shake of the photographing operation in step S86 is equal to or greater than the amount of shake stored in the memory 13 (step S87: NO), the controller 10 performs step S90.

When the amount of shake stored in the memory 13 is greater than the amount of shake of the photographing operation in step S86 (step S87: YES), the controller 10 extracts the brightness data from the image data photographed in step S86 and stores the brightness data and the amount of shake of the photographing operation In step S86 in the memory 13 so as to correspond to each other (step S88).

Subsequently, the controller 10 acquires the time lapsing after the second photographing operation is performed in step S85 at the time of performing the photographing operation in step S86 and judges whether the lapsing time is greater than the predetermined maximum photographing time (step S89). The measurement or calculation of the lapsing time can be easily embodied by using a built-in clock of the CPU 11 as a reference.

Here, when the time lapsing after the second photographing operation is not greater than the maximum photographing time, the controller 10 performs again step S86 and when it is greater than the maximum photographing time, the controller performs step S90.

The maximum photographing time means a threshold value in which the image data from which the correcting brightness data are extracted should be photographed until the maximum photographing time lapses after the performing the second photographing operation.

In step S90, the controller 10 corrects the image data photographed in step S65 by using the brightness data stored in the memory 13 and ends the procedure. The process of correcting the image data in step S90 is similar to the process (FIG. 4) described in the first embodiment.

According to the fourth embodiment, the image data of the second photographing operation are corrected using the image data photographed in the predetermined time after the second photographing operation to be corrected is performed Accordingly, in addition to the advantages which can be obtained with the configuration similar to the first embodiment, it is possible to acquire beautiful image data without shake for a shorter time. The image data in a long time after performing the second photographing operation may not be suitable for correction due to a variation in intensity of external light or a variation in photographing direction. In the fourth embodiment, by omitting the photographing operation of such an image, it is possible to effectively reduce the time required from the photographing operation to the correcting operation.

When the amount of shake at the time of photographing is greater than the amount of shake stored in the memory 13 in the course of performing a plurality of photographing operations with the normal exposure time, that is, when the amount of shake tends to increase, the photographing operation is ended. Generally, the shake has a feature that the amount of shake increases right after operating the shutter switch, slowly converges thereafter, and increases again after the convergence. Accordingly, if the amount of shake increases after operating the shutter switch, it can be considered that it is right after the amount of shake converges. Therefore, when the photographing operation is ended right after the amount of shake is changed to the increase from the convergence, the brightness data when the amount of shake is the least is stored in the memory 13.

In this way, by ending the photographing operation after the amount of shake is changed to the increase, it is possible to use the brightness data having the least amount of shake and being suitable for the correction.

Fifth Embodiment

Figure 9:
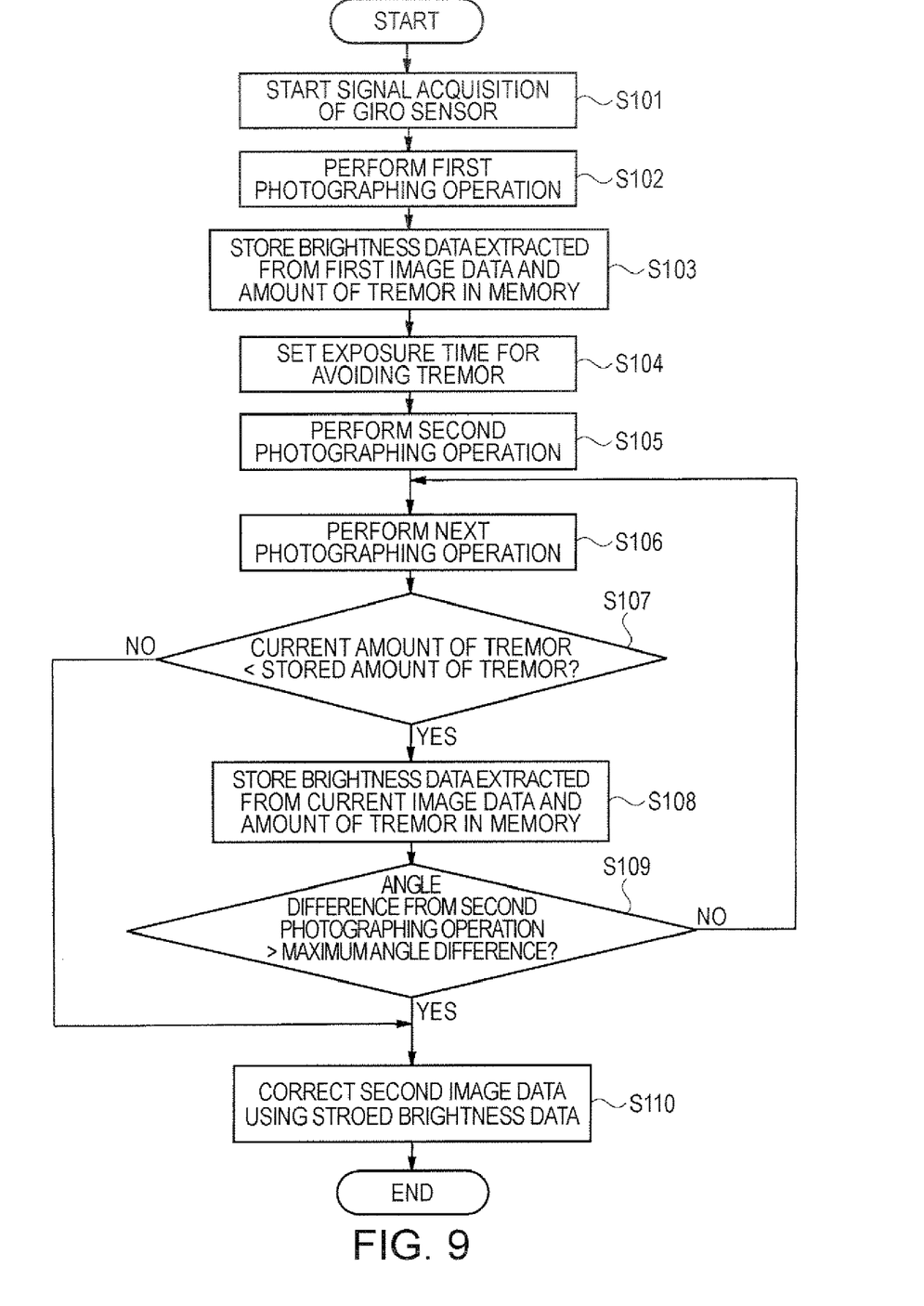
FIG. 9 is a flowchart illustrating a consecutive photographing operation of a digital camera according to a fifth embodiment of the invention.

FIG. 9 is a flowchart illustrating a consecutive photographing operation of a digital camera 1 according to a fifth embodiment of the invention.

In the fifth embodiment, since the digital camera 1 has the same configuration as the digital camera 1 according to the first embodiment, the constituent elements of the digital camera 1 are denoted by the same reference numerals and are not shown and described.

The consecutive photographing operation shown in FIG. 9 is performed instead of the consecutive photographing operation (FIG. 2) in the first embodiment. In the fifth embodiment, an example of performing a photographing operation with a short exposure time and a photographing operation with a normal exposure time plural times in the consecutive photographing operation, extracting the brightness data from the image data having the smallest amount of shake among the photographing operations with the normal exposure time, correcting the image data will be described. In the fifth embodiment, an angle about at the time of making the exposure time the shortest, that is, a difference in photographing direction, is calculated every time performing the photographing operation with the normal exposure time and ends when the difference departs from a predetermined range (value). In the fifth embodiment, similarly to the fourth embodiment, the amount of shake is calculated every time performing the photographing operation with the normal exposure time and ends the photographing operation when the amount of shake tends to increase.

In the fifth embodiment, the photographing operations subsequent to the first and the third photographing operations correspond to the normal photographing operation and the second photographing operation corresponds to the short-time photographing operation.

When the shutter switch of the operating unit 40 is operated and the consecutive photographing operation shown in FIG. 9 is started, the controller 10 starts introduction of the angular speed detection signal input from the gyro sensors 31, 32, and 33 of the gyro sensor unit 30 and calculation of the amounts of shake about the X, Y, and Z axes on the basis of the introduced angular speed detection signals (step S101).

Subsequently, under the control of the controller 10, the first photographing operation is performed by the photographing control circuit 21 and the image data are introduced (step S102). The controller 10 extracts the brightness data from the image data introduced in the first photographing operation and stores the brightness data along with the amount of shake for the exposure time of the first photographing operation in the memory 13 (step S103).

Next, the controller 10 sets the exposure time for avoiding the shake to suppress the influence of shake to the photographing unit 20 (step S104). The process of setting the exposure time for avoiding the shake in step S104 is similar to the process (FIG. 3) described in the first embodiment.

Thereafter, under the control of the photographing control circuit 21, the second photographing operation is performed with the exposure time for avoiding the shake (step S105).

Subsequently, the controller 10 performs the following photographing operation with the normal exposure time (step S106) and compares the amount of shake of this photographing operation with the amount of shake stored in the memory 13 along with the brightness data (step S107). Here, when the amount of shake of the photographing operation in step S106 is equal to or greater than the amount of shake stored in the memory 13 (step S107: NO), that is, when the amount of shake of the photographing operation is greater than the amount of shake of the previous photographing operation, the controller 10 performs step S110 to end the photographing operation.

When the amount of shake stored in the memory 13 is greater than the amount of shake of the photographing operation in step S106 (step S107: YES), the controller 10 extracts the brightness data from the image data photographed in step S106 and stores the brightness data and the amount of shake of the photographing operation in step S106 in the memory 13 so as to correspond to each other (step S108).

Subsequently, the controller 10 acquires a difference in angle between when the second photographing operation is performed in step S105 and when the photographing operation is performed in step S106 and judges whether the difference in angle is greater than the predetermined maximum angle difference (step S109). Here, the difference in angle means a difference in direction which the image pickup surface of the image sensor 23 faces at the time of photographing and can be easily acquired by performing an operating process with the signals input from the gyro sensors 31, 32, and 33 of the gyro sensor unit 30. Here, the maximum angle difference is a threshold value in which it is suitable that the difference between the photographing direction at the time of photographing the image data from which the correcting brightness data are extracted and the photographing direction of the second photographing operation is smaller than the maximum angle difference.

When the difference in angle from the second photographing operation is not greater than the maximum angle difference (step S109: NO), the controller 10 performs step S106 again and performs step S110 when it is greater than the maximum angle difference (step S109: YES).

In step S110, the controller 10 corrects the image data photographed in step S65 by using the brightness data stored in the memory 13 and ends the procedure. The process of correcting the image data in step S110 is similar to the process (FIG. 4) described in the first embodiment, for example.

According to the fifth embodiment, the bright data are extracted from the image data of which the angle difference is in a predetermined range by with respect to the second photographing operation to be corrected and are used for correction. The image data acquired from the photographing operation having a photographing direction different from that of the second photographing operation may not be suitable for the correction. In the fifth embodiment, in addition to the advantages which can be obtained with the configuration similar to the first embodiment, by omitting the photographing operation of such an image, it is possible to effectively reduce the time required from the photographing to the correction.

The above-mentioned embodiments are only examples of the invention and may be modified and applied in various forms without departing from the scope of the invention.

That is, in the first to fifth embodiments, it has been described that the second photographing operation with the exposure time shorter than the normal exposure time is performed by the photographing unit 20. This is intended to set the exposure time shorter than the exposure time of the first photographing operation Accordingly, when the normal exposure time is acquired before performing the photographing operation and the short exposure time is determined on the basis of the acquired exposure time, the photographing operation with the short exposure time may be first performed. The photographing operation with the short exposure time may be performed third or later time and the order is not defined.

In the above-mentioned embodiments, it has been described that the photographing control circuit 21 stores the image data input from the image sensor 23 in the memory 22 and displays the photographed image on the display panel 25 on the basis of the image data stored in the memory 22. However, at the time of performing the consecutive photographing operation, the image data having been corrected by the controller 10 may be displayed on the display panel 25. In this case, a user can see and check the image data having been corrected.

In the embodiments, the angular speed is detected by the gyro sensor unit 30 having the gyro sensors 31, 32, and 33 so as to detect the movement of the digital camera 1. The invention is not limited to it, but for example, an acceleration sensor may be used so long as it can detect the amount of movement per unit time of the digital camera 1.

Although it has been described in the above-mentioned embodiments that the digital camera 1 includes the mechanical shutter driven with the shutter driving unit 26, the invention is not limited to the configuration, but any configuration may be employed so long as the photographing control circuit 21 can take out the signals corresponding to the exposure of the image sensor 23 for the exposure time. Accordingly, by always exposing the image sensor 23 and controlling the time for refreshing CCD or CMOS of the image sensor 23, the signals corresponding to the exposure time may be taken out, and other methods may be employed.

Although it has been described in the embodiments that the digital camera 1 is a portable digital still camera photographing a still image, the invention is not limited to it, but the invention may have a function of photographing a moving image by performing a photographing operation in 30 frames per second or the above-mentioned correction may be performed to the respective frames of images of the photographed moving image. The invention can be applied to photographing equipments having a still image photographing function or a moving image photographing function, in addition to the digital camera specific examples thereof can include a camera built-in mobile phone, a silver salt camera, and a PDA or a notebook computer which can be mounted internally or externally with a camera.

The entire disclosure of Japanese Patent Application No. 2005-343367, filed Nov. 29, 2005 is expressly incorporated by reference herein.

What is claimed is:

1. A controller comprising:
   a photographing control unit controlling an image pickup unit taking a photograph of an object to perform a short-time photographing operation in which a first exposure time is set shorter than a normal exposure time and to perform a normal photographing operation in which a second exposure time is set to the normal exposure time; and
   an image correcting unit acquiring correction information for correcting first image data taken in the short-time photographing operation and correcting the first image data using the acquired correction information, wherein the image correcting unit acquires second image data taken in the normal photographing operation as the correction information, and wherein the image correcting unit extracts brightness information from the second image data and corrects the first image data on the basis of the brightness information.

2. The controller according to claim 1, further comprising a shake detecting unit detecting an amount of shake of the normal photographing operation, wherein the photographing control unit performs the normal photographing operation several times by the use of the image pickup unit, and wherein the image correcting unit acquires the image data of the normal photographing operation, in which the amount of shake detected by the shake detecting unit is the smallest, among the several normal photographing operations as the correction information.

3. The controller according to claim 2, wherein the photographing control unit does not allow the subsequent normal photographing operation when the number of photographing operations is greater than a predetermined number.

4. The controller according to claim 2, wherein the photographing control unit does not allow the subsequent normal photographing operation when the time lapsed after the short-time photographing operation is performed is greater than a predetermined time.

5. The controller according to claim 2, wherein the photographing control unit acquires a difference in photographing direction at the time of normal photographing operation on the basis of the short-time photographing operation and does not allow the subsequent normal photographing operation when the difference departs from a predetermined range.

6. The controller according to claim 2, wherein the photographing control unit does not allow the subsequent normal photographing operation when the amount of shake detected by the shake detecting unit at the time of the normal photographing operation does not depart from a predetermined range.

7. The controller according to claim 2, wherein the photographing control unit does not allow the subsequent normal photographing operation when the amount of shake detected by the shake detecting unit at the time of the normal photographing operation is greater than the amount of shake detected at the time of performing the previous normal photographing operation.

8. A photographing equipment comprising:
an image pickup unit taking a photograph of an object;
a photographing control unit controlling the image pickup unit to perform a short-time photographing operation in which a first exposure time is set shorter than a normal exposure time and to perform a normal photographing operation in which a second exposure time is set to the normal exposure time; and
an image correcting unit acquiring correction information for correcting first image data taken in the short-time photographing operation and correcting the first image data using the acquired correction information, wherein the image correcting unit acquires second image data taken in the normal photographing operation as the correction information, and wherein the image correcting unit extracts brightness information from the second image data and corrects the first image data on the basis of the brightness information.

9. A control method of a photographing equipment having an image pickup unit taking a photograph of an object, the method comprising:
controlling the image pickup unit to perform a short-time photographing operation in which a first exposure time is set shorter than a normal exposure time;
controlling the image pickup unit to perform a normal photographing operation in which a second exposure time is set to the normal exposure time; and
acquiring correction information for correcting first image data taken in the short-time photographing operation and correcting the first image data using the acquired correction information, wherein the acquiring correction information for correcting the first image data includes extracting brightness information from second image data taken in the normal photographing operation, and wherein correcting the first image data using the acquired correction information includes correcting the first image data on the basis of the brightness information.

* * * * *